United States Patent Office 2,780,058
Patented Feb. 5, 1957

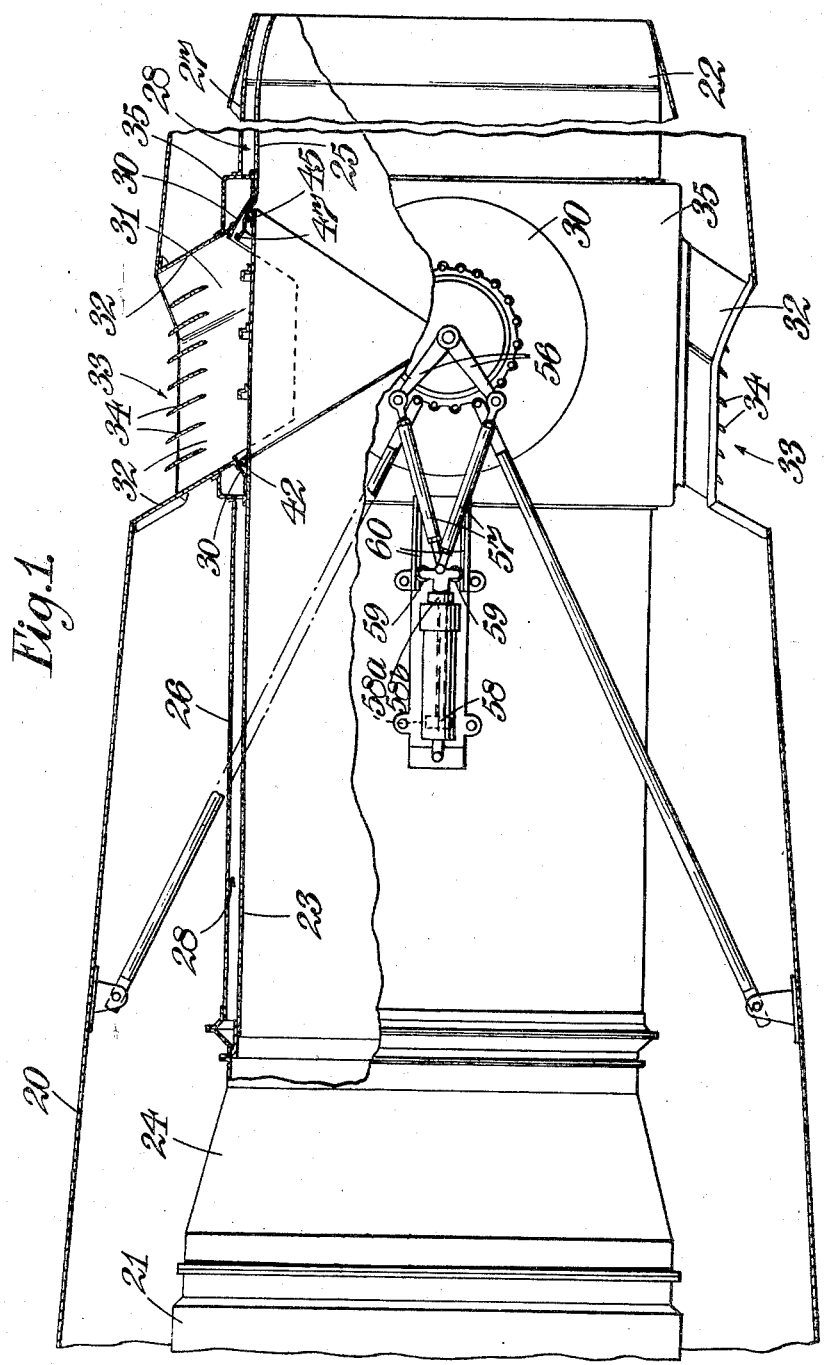

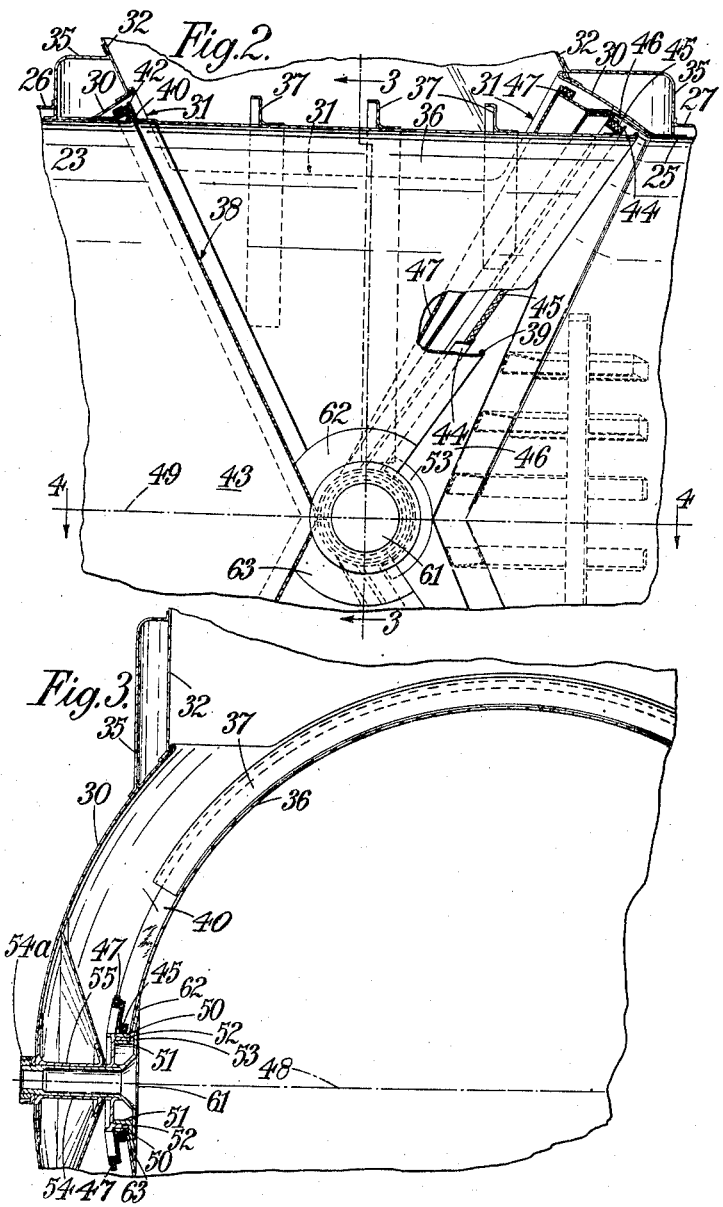

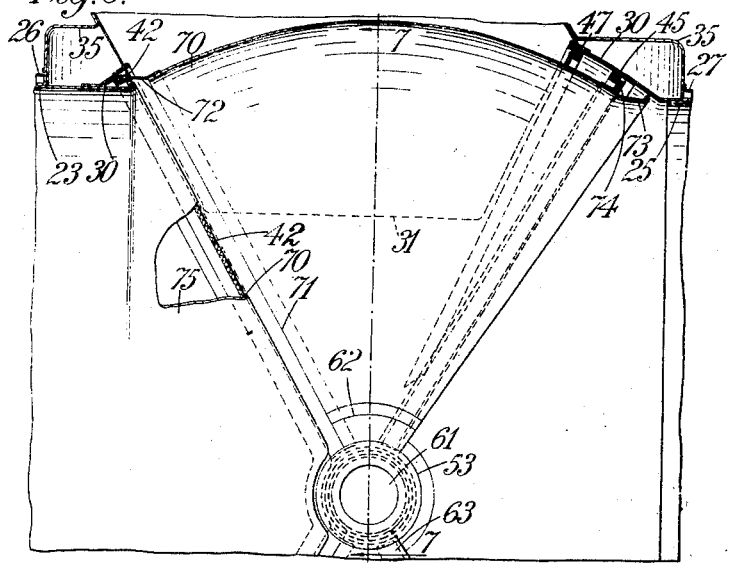
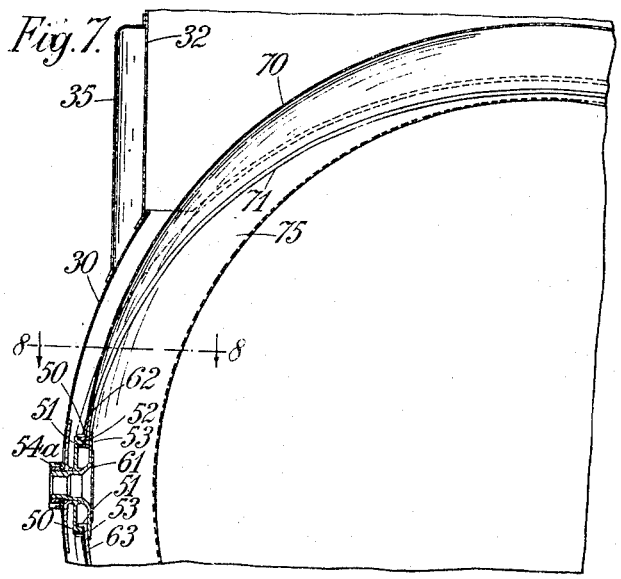

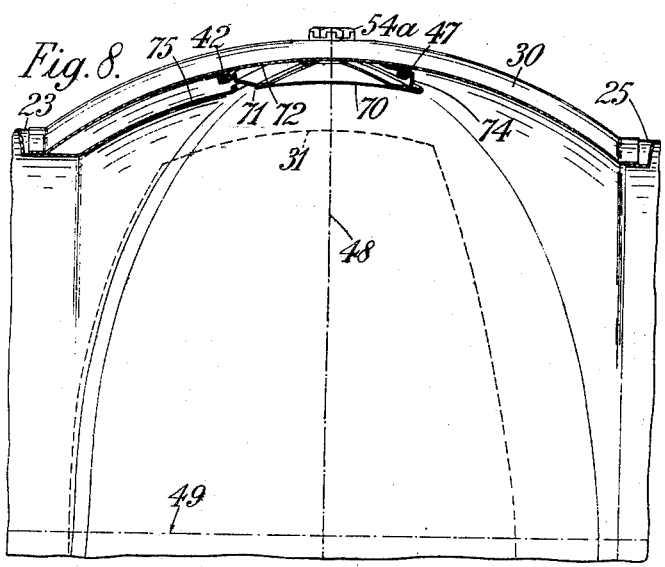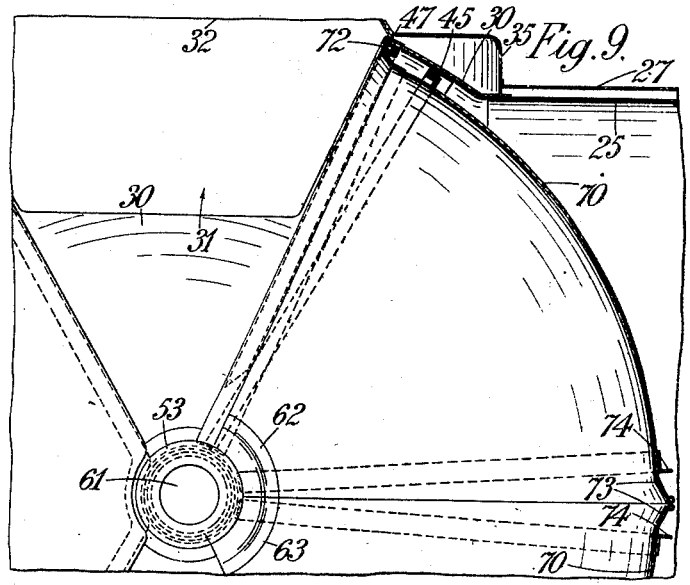

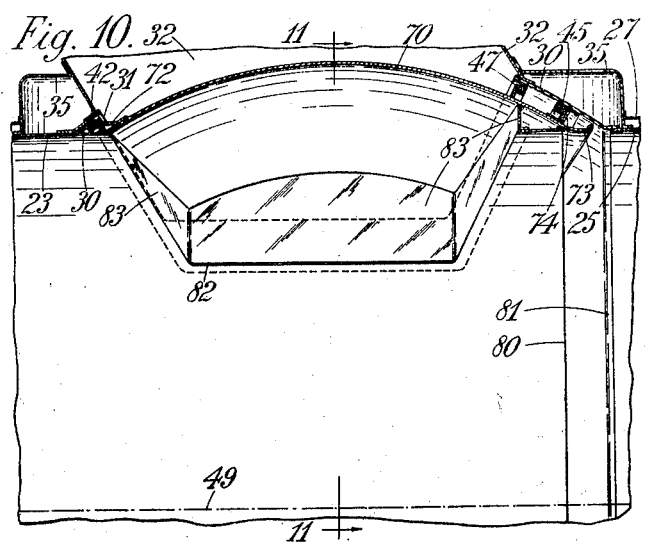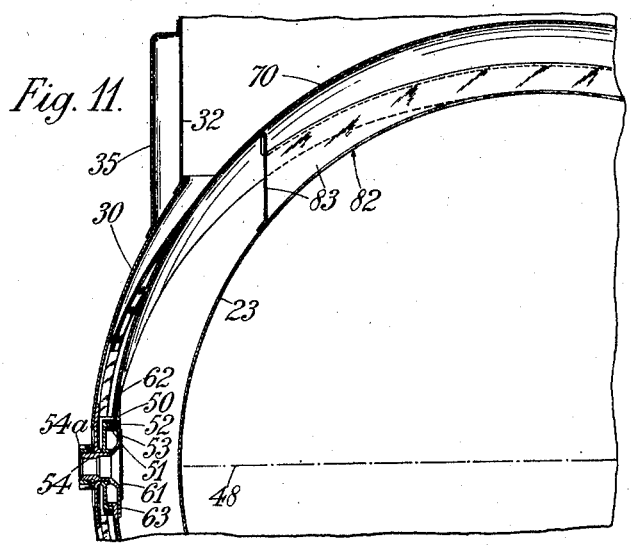

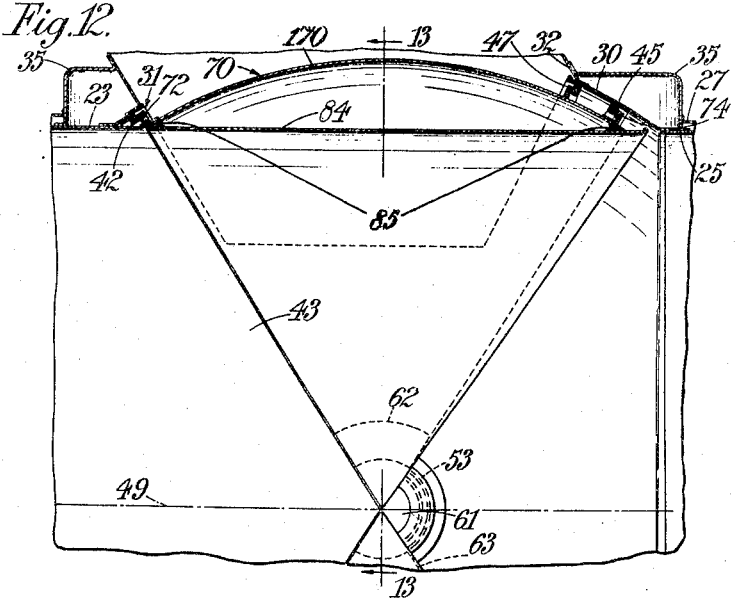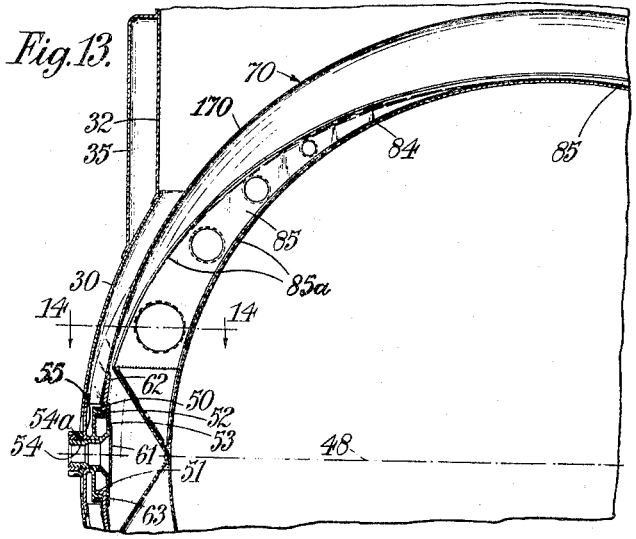

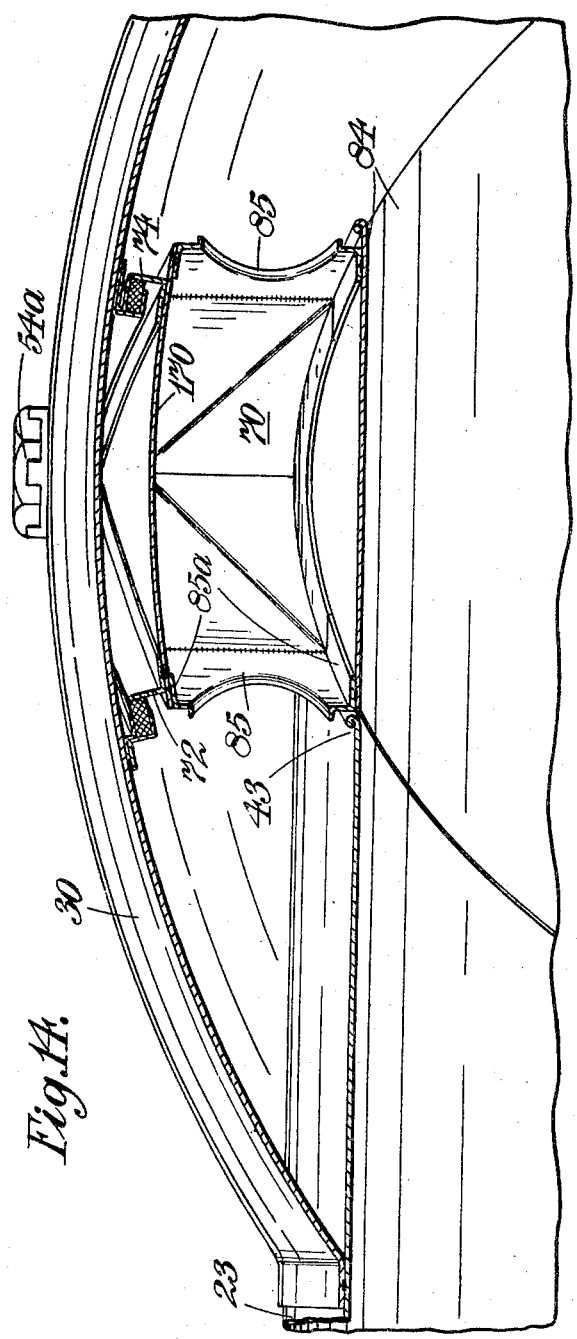

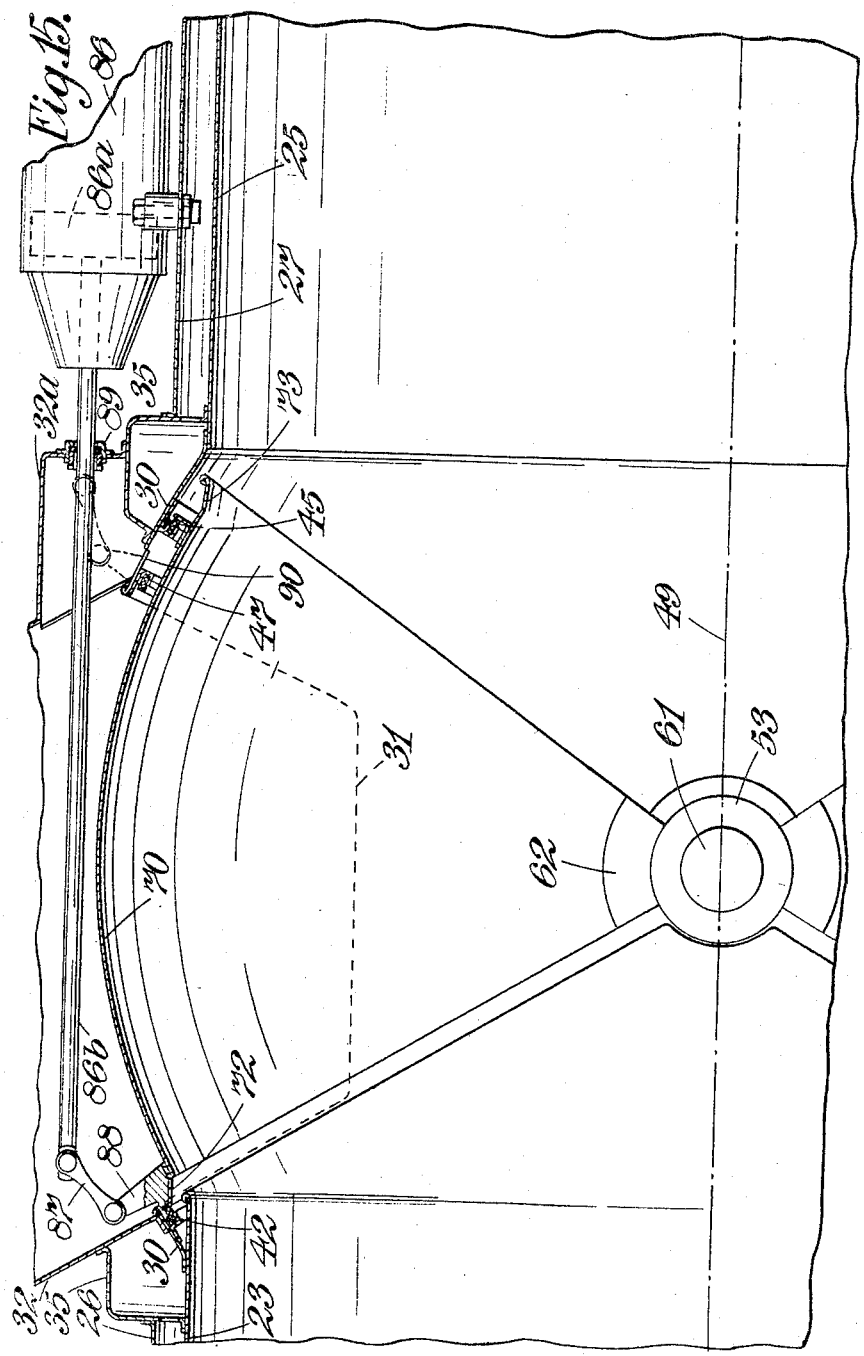

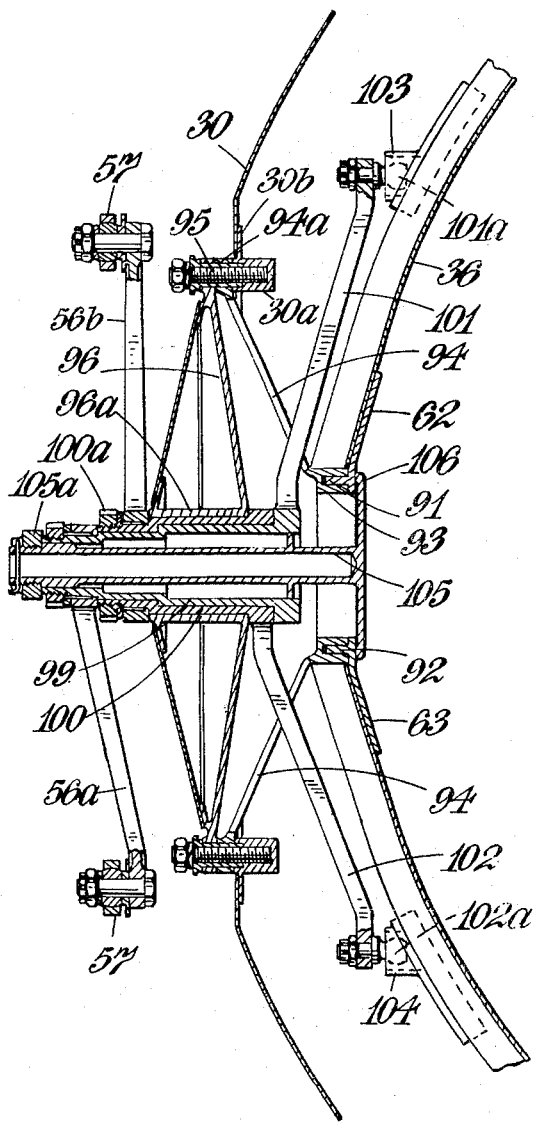

2,780,058

AIRCRAFT REACTION PROPULSION UNITS AND INSTALLATIONS WITH MEANS TO PRODUCE REVERSE THRUST

Richard Derby Beale, Quarndon, Derek Howard Jubb, Manningham, Bradford, and Basil Charles James Stevenson, Allestree, England, assignors to Rolls-Royce Limited, Derby, England, a British company Application January 19, 1954, Serial No. 404,926

Claims priority, application Great Britain November 20, 1953

9 Claims. (Cl. 60—35.54)

This invention relates to aircraft reaction-propulsion units and installations in which a gas flow in a jet-pipe passes to atmosphere from the jet-pipe through a propulsion nozzle thereby to provide a propulsive thrust. Such units and installations may comprise, for instance, gas-turbine engines of the reaction-propulsion kind.

Difficulties have arisen in operation of aircraft having such reaction-propulsion units, more particularly in landing of aircraft fitted with such units, because there is little braking effect on the aircraft due to the low aerodynamic drag of installations embodying such reaction-propulsion units, and also due to the existence of a residual thrust from the propulsion unit even when the unit is operating at its minimum power. As a result, a more extensive landing space may be required for an aircraft fitted with such reaction-propulsion units than for a conventional propeller-driven aircraft in which a braking effect is normally provided by the propellers when the aircraft is landing, and which may be fitted with reversible-pitch propellers.

It is an object of the present invention to provide an improved aircraft reaction propulsion unit or installation in which the foregoing difficulties are reduced.

According to the present invention, an aircraft reaction-propulsion unit or installation comprises a jet-pipe, a propulsion nozzle at the outlet end of the jet-pipe, said jet-pipe comprising at a location upstream of the propulsion nozzle a bulbous wall portion of part-spherical contour, auxiliary ducting adapted to communicate with the jet-pipe through porting in said bulbous wall portion and inclined in a forward direction from the portion to an outlet end through which the auxiliary ducting opens to atmosphere in a manner such that gas flowing therethrough produces a braking effect on an aircraft fitted with the unit, and at least one valve member adapted to swing about an axis at right angles to the jet-pipe axis and passing through it and adapted in one angular position to close-off the passage through said auxiliary ducting and in a second angular position to block the flow through the jet-pipe to the propulsion nozzle. Preferably the porting comprises ports at opposite sides of the bulbous wall portion of the jet-pipe and in this case two valve members are provided, one for each port, and the valve members are arranged in the second angular position each to extend across half the jet-pipe passage so as together to block it.

It will be seen that with the arrangement of the invention each valve member fulfils two purposes by closing-off the porting in one position and by blocking the jet-pipe in a second position.

In one preferred arrangement, each valve member is part-cylindrical and in its first position occupies a correspondingly-shaped gap in the jet-pipe wall. It will be clear that the valve member will have the shape of the part of the wall of a cylinder defined between a pair of planes inclined to one another so as to meet on or near a line extending through the cylinder axis. In this case the gap in the jet-pipe wall may be of such an axial extent that, in the plane through the axis of the jet pipe normal to the swinging axis, its upstream and downstream edges are coincident with the extremities of the cylindrical jet-pipe portions, that is, in this plane there is no part-spherical wall of the bulbous portion. The part-spherical portion of the wall will however become apparent at sections nearer the swinging axis.

In another preferred arrangement, each valve member is also part-spherical and is pivoted within the bulbous wall portion to swing about a diameter which is common to the part-spherical contour of the bulbous wall portion and of the valve member. With this arrangement the bulbous wall portion and each valve member may have such a diameter that the valve member, in the one of its positions, lies wholly outside an imaginary cylinder which geometrically joins the cylindrical jet-pipe portions which extend upstream and downstream from the bulbous wall portion. In such a preferred arrangement, the cylindrical portion of the jet-pipe upstream of the part-spherical wall portion may be provided with a cylindrical extension to within the bulbous wall portion, which cylindrical extension projects close to but is spaced from the downstream cylindrical jet-pipe portion so as thereby to leave a gap through which each valve member travels in moving between its first and second positions, and which cylindrical extension has an aperture or apertures corresponding to the porting. With this arrangement the disturbance to flow of gases in the jet-pipe when the valve members are in their first positions may be substantially less than where no such cylindrical extension is provided. Alternatively in such a preferred arrangement, each valve member may be externally part-spherical and internally cylindrical and in this case an extension may be provided from the upstream cylindrical portion of the jet-pipe to close to the upstream edeg of the valve member when it is in its first position.

Some embodiments of this invention will now be described with reference to the accompanying drawings, in which Figure 1 is a view partly in section of a jet-pipe installation in aircraft structure, Figure 2 is an enlarged view of part of Figure 1, showing a first embodiment in accordance with the invention, Figure 3 is a section on the line 3—3 of Figure 2, Figure 4 is a section on the line 4—4 of Figure 2, Figure 5 is a view corresponding to Figure 2, showing parts in an alternative position of adjustment, Figure 6 is a view corresponding to Figure 2 of a second embodiment.

Figure 7 is a section on the line 7—7 of Figure 6,

Figure 8 is a section on the line 8—8 of Figure 7,

Figure 4:
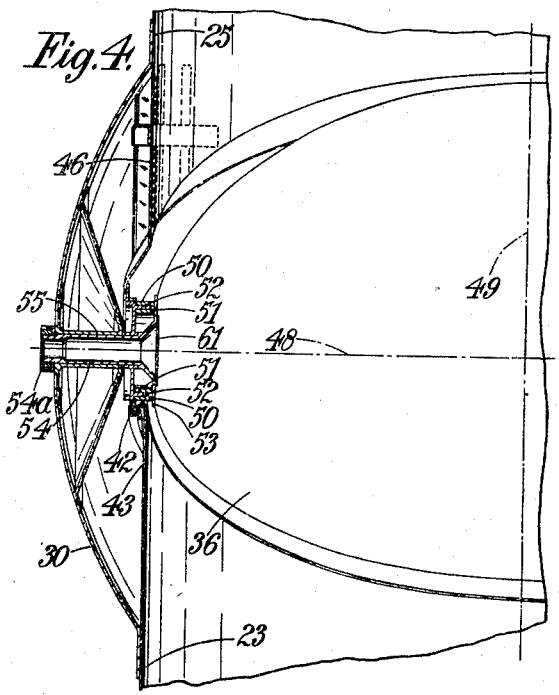
Figure 5:
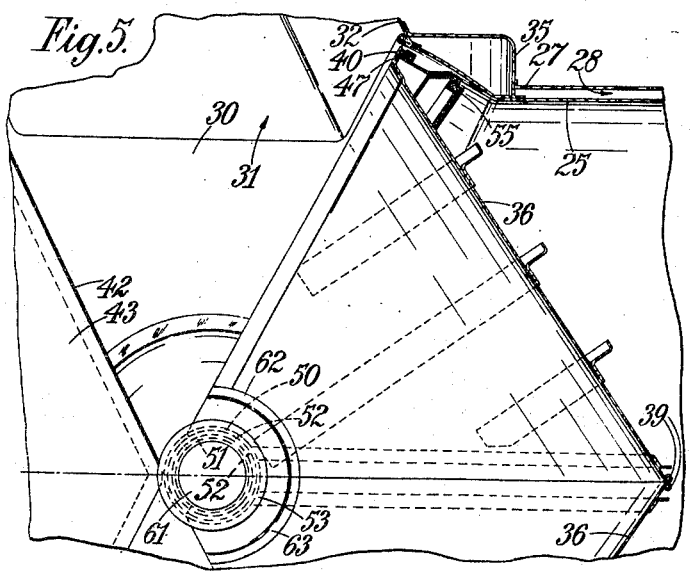

Figure 9 is a view corresponding to Figure 6 with parts in an alternative position of adjustment, Figure 10 is a view corresponding to Figure 2 of a third embodiment, Figure 11 is a section on the line 11—11 of Figure 10, Figure 12 is a view corresponding to Figure 2 of a fourth embodiment, Figure 13 is a section on the line 13—13 of Figure 12, Figure 14 is a section on the line 14—14 of Figure 13, Figure 15 illustrates one form of operating means for the arrangements shown in Figures 2–14, and Figure 16 illustrates an alternative form of operating means to that shown in Figure 15 and an alternative mode of supporting the movable parts to that shown in Figures 2 to 14.

Referring first to Figure 1, there is illustrated a jet-pipe installation in an aircraft structure 20, the jet pipe leading from a gas-turbine engine 21 to a propelling nozzle 22 at the outlet end of the jet-pipe.

The jet pipe comprises an upstream cylindrical portion 23 connected to the exhaust cone structure 24 of the engine 21, and a downstream cylindrical portion 25 leading to the nozzle 22, and the jet-pipe has an outer casing in two parts 26, 27 enclosing the portions 23, 25 respectively to provide a cooling air flow passage 28 from adjacent the exhaust cone structure 24 to the nozzle 22.

In order to obtain a braking effect on the aircraft, say when landing, an arrangement such as is illustrated in the drawings may be provided.

In each arrangement, the jet-pipe portions 23, 25 are interconnected by a part-spherical jet-pipe wall portion 30 which has provided in it oppositely-disposed ports 31 leading to ducting afforded by wall members 32. The ducting is inclined forwardly in the direction of flight of the aircraft and opens to atmosphere through outlets 33, and guide vanes 34 may be provided adjacent the outlets. It will be clear that exhaust gases issuing through the outlets 33 will produce a braking thrust on the aircraft, that is a thrust which has a substantial component acting in a direction opposite to that produced by flow of exhaust gases through the nozzle 22.

The part spherical portion 30 of the jet-pipe is partly surrounded by a casing 35 which forms a transfer section joining the upstream part of the passage 28 within the casing part 26, to the downstream part of the passage within casing 27.

Referring now more particularly to Figures 2 to 5, there is shown one form of valve means by which the flow of exhaust gas to the ports 31 and nozzle 22 is controlled.

There are provided a pair of valve members 36 having part-cylindrical walls stiffened by members 37, the edges 38, 39 of the walls being contained substantially in planes at an angle to one another and the downstream edge planes extending through the common axis about which the valve members 36 are pivoted, and upstream edge planes passing somewhat upstream of this axis. The upstream edges 38 have outward flanges 40 to co-operate, when the valve members are in the position of Figure 2, with sealing strips 42 carried on an extension 43 of the jet-pipe portion 23 to within the spherical wall portion 30, which extension has its maximum axial extent adjacent the trunnions for the valve members 36. The downstream edges 39 carry angle members 44 to co-operate, in the position of Figure 2, with sealing strips 45 carried on an extension 46 of the jet-pipe wall portion 25, and this extension also carries a second sealing strip 47 to co-operate with the flange 40 when the valve members 36 are in the position shown in Figure 5. In this position the valve members extend across the jet-pipe and have their edges 39 in contact so as to prevent the exhaust gas from flowing to the propulsion nozzle 22 and so as to constrain the exhaust gas to flow through the porting 31 which is uncovered. The sealing strips are preferably flexible braided metallic strips, of heat-resisting material.

As will be more clearly seen from Figures 1, 3 and 4 the valve members 36 are mounted in trunnions at each side of the jet-pipe to swing about a common axis 48 which is a diameter of the part-spherical wall portion 30 and is at right angles to the jet-pipe axis 49.

Each valve member 36 has secured to it a ring, referenced 50, 51 respectively, one (50) of which engages outside a stationary bearing member 52 of the trunnion and the other (51) of which engages inside the bearing member 52. The rings 50, 51 are maintained in engagement with the bearing member 52 by a flange 53 forming the head of a bolt member 54 extending through the bearing member 52 and through a supporting tube 55 carried on the part-spherical wall 30, and the bolt member 54 is retained in position by a nut 54a.

The hollow bolt members 54 have blanking plates 61 welded to them to prevent leakage of gas from the jet-pipe through them to atmosphere.

Each of the rings 50 and 51 is connected to its respective valve member 36 by means of a sector shaped, radially-extending flange 62, 63 respectively, the angular extent of which is the same as the angular extent of the valve member. The sector-shaped flanges have the part-spherical sheet-metal members forming the valve elements welded to them.

Referring now to Figures 6 to 9, there is shown an arrangement in which part-spherical valve members 70 are employed, which valve members have such a radius as to lie wholly outside the imaginary cylindrical surface which geometrically joins the jet-pipe wall portions 23, 25. The upstream edges 71 of the valve members 70 carry flanged members 72 to contact the sealing strips 42 and 47 and the downstream edges 73 are flared outwards and carry angle members 74 to contact the sealing strips 45. The sealing strips in this construction are carried directly on the part-spherical wall portion 30. The planes of the edges 71, 73 of the valve members 70 make an angle of about 60° to one another.

In this construction also, the upstream jet-pipe wall portion 23 has a part-spherical extension 75 to within the wall portion 30, and when the valve members 70 are in the position shown in Figure 6, the beaded edge 76 of the extension lies close to the upstream edges 71 of the valve members 70. In this arrangement, owing to the greater radius of valve members 70, the bolt member 54 and supporting tube 55 is somewhat shorter than in the arrangement of Figures 2–5.

Referring now to Figures 10 and 11, there is illustrated an arrangement having valve members 70 which are the same as those illustrated in Figures 6 to 9 but in which the upstream jet-pipe wall portion 23 is extended substantially through the spherical wall portion 30 to have its downstream edge 80 but narrowly spaced from the upstream edge 81 of the downstream jet-pipe wall portion 25. The spacing of the edges 80, 81 is just sufficient to permit the passage of the valve members 70 from the position shown in Figures 10 and 11 in which they block off the passage through the porting 31 in the spherical wall 30 to the position corresponding to that shown in Figure 9 for a previously described arrangement, in which the passage through the porting 31 is uncovered and the valve members 70 close-off the passage through the jet-pipe towards the propelling nozzle 22. The extension of the cylindrical wall portion 23 of the jet-pipe has apertures 82 formed in it to correspond in location to the porting 31 and flanged members 83 are secured externally of the extension of the wall member 23 around each aperture to assist in directing exhaust gases from the jet-pipe into the auxiliary ducting formed by the wall members 32.

It will be seen that the upstream edge 71 of each valve member 70 lies close to the adjacent portion of the flange 83 when the valve member 70 is in the position to blank off the passage through the porting 31. As a result the height of the flange 83 is a minimum in a plane at right angles to the swinging axis of the valve member 70 and containing the axis 49 of the jet-pipe and increases in height laterally from this plane so that its edge lies close to the valve member 70.

Referring now to Figures 12 to 14, there is illustrated another arrangement, and in this arrangement the valve members 70 have a part-spherical portion 170 similar to the valve members 70 and carrying the flanges 72, 74, and are additionally provided with part-cylindrical inner walls 84 which when the valve members are in a position to close-off the passage through the porting 31 form smooth continuations of the upstream jet-pipe wall portion 23. As in the construction of Figures 2 to 5, the jet-pipe wall portion 23 has an axial extension 43 of cylindrical form and the extension 43 has its downstream edge lying close to the upstream edge of the part-cylindrical inner walls 84 of the valve members.

As will best be seen from Figures 13 and 14, the inner part-cylindrical wall 84 is connected to the part-spherical wall 170 by circumferentially-extending perforated tapering members 85 of which there is one adjacent the upstream edge and one adjacent the downstream edge of each valve member. The members 85 are secured to the walls 70, 84 by means of flanges 85a.

With this arrangement there is provided a smooth wall to the jet-pipe as far as the downstream edges of the valve members.

The valve members may be operated in any convenient manner, for example they may be operated as shown in Figure 15, in which the valve members are shown as being of the construction of Figures 6 to 9. However it will be appreciated that the operating means of Figure 15 is equally applicable to the constructions shown in Figures 2–5, 10–11 and 12–14.

It will also be appreciated that with the operating means of Figure 15, the trunnion mountings at each side of the jet-pipe may be similar, and as shown in Figures 2–14. In this construction of operating means each valve member 36 or 70 has its own ram 86 arranged externally of the jet-pipe portion 25 and having its piston 86a connected by an operating rod 86b and link 87 to a bracket 88 mounted on the valve member 36 or 70 adjacent the upstream edge thereof. The wall 32 has a swelling 32a on it to carry a packing gland 89 through which the rod 86b runs and the part-spherical wall 30 and the sealing strip 47 are cut away locally at 90 to accommodate the bracket 88 when the valve members 70 are moved to the position corresponding to Figure 9.

An alternative form of operating means for the valve members is shown in Figure 16, and in this construction there is provided for each valve member a radius arm 56a, 56b which are connected by links 57 and operating rod 58b to the piston 58a of a ram 58 mounted on the outer casing 26. The rod 58b is guided by rollers 59 running in guides 60.

In this case the trunnion mountings at one side of the jet pipe may be as shown in Figures 2–14 and the trunnion mountings at the other side of the jet pipe as shown in Figure 16, but preferably the trunnion mountings at both sides of the jet pipe will be as shown in Figure 16, the operating rams preferably being hydraulically interconnected for simultaneous operation. The operating means of Figure 16 may be applied to any of the constructions shown in Figures 2–14.

In this arrangement each of the valve members 36 or 70 has secured to it adjacent the trunnion arrangement a sector-shaped flange corresponding to the flanges 62, 63 and the sector-shaped flanges in this case have axially-extending part-annular bearing pieces 91, 92 respectively, each of which bearing pieces is of the same angular extent as the sector-shaped flanges 62, 63 and each of which bearing pieces engages in an annular channel in a bearing member 93 which is supported from the part-spherical wall portion 30 of the jet-pipe through an apertured frusto-conical member 94 which has an enlarged ring 94a at its larger-diameter end to receive setscrews 95 by which it is secured to tapped bosses 30a on a ring 30b which is welded to the internal surface of the jet-pipe wall portion 30. Also secured to ring 30b by setscrews 95, and outside member 94, is a second frusto-conical member 96 of greater cone angle than member 94 and having a tubular boss 96a at its centre which provides a bearing support for the actuating means for the valve members 36 or 70. The member 96 closes the aperture formed by ring 30b and thus prevents leakage of gas.

The actuating means comprises for each valve member 36 or 70 a radius arm, referenced 56a, 56b and the links 57 are pivoted to the arms 56a, 56b which are splined respectively on hollow shafts 99, 100, nested one within the other, and the outermost of the hollow shafts, that is the shaft 100, engages rotatably within the tubular boss 96a. The two shafts 99, 100 are thus capable of relative rotational movement with respect to one another and with respect to the boss 96a.

The shaft 100 has a shoulder at its inner end which abuts the end of boss 96a, and at the outer end of the shaft the boss of the radius arm 56b is secured against another shoulder by nut 100a, thus locating the shaft axially in boss 96a. Similarly shaft 99 has a shoulder at its inner end which abuts the end of shaft 100, and at the outer end the boss of the radius arm 56a is secured against a shoulder on the other end of the shaft 99 by a nut 99a, the boss of radius arm 56a being arranged to have a small axial clearance from the end of shaft 100, thus to locate shaft 99 axially. The shafts 99, 100 are formed at the shoulders at their inner ends, beyond member 96, each with a second radius arm 101, 102 respectively, the outer ends of which are provided each with a corresponding peg 101a, 102a to engage in a socket 103, 104 on the respective valve members.

With this arrangement, when the ram telescopes, the radius arms 56a, 56b are rocked to equal angular extents and in opposite directions and the radius arms 101, 102 are rocked correspondingly so that the valve members are swung from the position in which they close off ports 31 to the position in which they open ports 31 and abut one another to block the downstream part 25 of the jet pipe.

The bearing pieces 91, 92 are retained in engagement with the annular channel in the bearing member 93 by means of a bolt member 105 having a flanged head 106 which bears axially on the sector-shaped flanges 62, 63 at their radially inner ends, and the bolt member is located axially with respect to the boss 96a and hollow shafts 99, 100 by extending through the hollow shaft 99 and being secured in position by a nut 105a abutting the outer end of shaft 99. The bolt member 105 also prevents leakage of gas through the centre of shaft 99.

The apertures in the member 94 are preferably sealed, for example by means of flexible metallic bellows which are secured around the apertures at their peripheries and are secured at their centres to arms 101, 102 to permit the required limited angular movement of the arms. In this manner communication is prevented between the oppositely-disposed ducts formed by walls 32, and leakage of air from one to the other is prevented in flight of the aircraft when the ports 31 are closed. In this manner the need for doors to close the outlets 33 may be eliminated. However, if desired, any suitable form of doors may be provided.

The gas loads acting on the jet pipe when the exhaust gases are ejected forwardly through outlets 33 may be taken in any convenient manner, for example rods 107 may be provided (see Fig. 1) secured at one end to the rings 30b, 96 by means of setscrews 95, and secured at their other ends to the aircraft structure.

We claim:

1. An aircraft reaction propulsion unit or installation comprising a jet pipe, a propulsion nozzle at the outlet end of said jet pipe, said jet pipe having first porting therein upstream of the propulsion nozzle, fairing structure surrounding said jet pipe in spaced relation thereto, wall means between said jet pipe and the fairing structure, said wall means being in gas sealing engagement with said jet pipe around the porting therein and forming a chamber externally of the jet pipe in communication with the jet pipe through said first porting, auxiliary ducting extending from said wall means to said fairing structure and adapted to communicate with said chamber through second porting in said wall means and with atmosphere through third porting in said fairing, and said auxiliary ducting being inclined in a forward direction where it opens to atmosphere whereby gas flowing therethrough produces a braking effect on an aircraft fitted with the unit, a valve member disposed within said chamber, pivot means to support said valve member to swing on an axis at right angles to and passing through the jet pipe axis between a first angular position in which it closes-off the first porting and a second angular position in which it blocks the flow through the jet pipe to the propulsion nozzle, first sealing means secured externally of the jet pipe upstream of said first porting, second sealing means mounted on the upstream edge of said valve member and adapted in said first angular position of the valve member to co-operate in gas sealing contact with said first sealing means, third sealing means carried by said wall means downstream of said first porting and adapted in said second angular position of the valve member to co-operate in gas sealing contact with the second sealing means, and fourth sealing means mounted on the downstream edge of said valve member and adapted to co-operate in gas sealing contact with the third sealing means when said valve member is in said first angular position.

2. An aircraft reaction propulsion unit or installation comprising a jet pipe, a propulsion nozzle at the outlet end of said jet pipe, said jet pipe having first porting therein at opposite sides thereof upstream of the propulsion nozzle, fairing structure surrounding said jet pipe in spaced relation thereto, wall means encircling said jet pipe in gas sealing engagement therewith adjacent said first porting and adapted to afford a part-spherical walled chamber in communication with the jet pipe through said first porting, auxiliary ducting at opposite sides of said jet pipe and extending from said wall means to said fairing structure and adapted to communicate with said chamber through second porting in said wall means and with atmosphere through third porting at opposite sides of said fairing, said auxiliary ducting being inclined in a forward direction where it opens to atmosphere whereby gas flowing therethrough produces a braking effect on an aircraft fitted with the unit, a pair of valve members disposed within said chamber, the one to co-operate with the first porting at one side of the jet pipe and the other to co-operate with the first porting at the opposite side of said jet pipe, pivot means to support said valve members to swing on an axis at right angles to and intersecting the jet pipe axis between first annular positions in which each valve member closes off its associated first porting and second angular positions in which the valve members together block the flow through the jet pipe to the propulsion nozzle, and sealing means associated with each of said nozzle members and the adjacent portions of the jet pipe and of the wall means comprising first sealing means secured externally of the jet pipe upstream of the first porting associated with the valve member, second sealing means mounted on the upstream edge of said valve member and adapted in said first angular position of the valve member to co-operate in gas sealing contact with said first sealing means, third sealing means carried by said wall means downstream of said first porting and adapted in said second angular position of the valve member to co-operate in gas sealing contact with the second sealing means, and fourth sealing means mounted on the downstream edge of said valve member and adapted to co-operate in gas sealing contact with said third sealing means when said valve member is in its first angular position.

3. An aircraft reaction-propulsion unit or installation as claimed in claim 2 wherein the jet pipe is cylindrical upstream and downstream of the first porting, and each valve member is part-cylindrical and in its first angular position extends in the plane at right angles to the swinging axis between the upstream and downstream extremities of the part-spherical walled chamber, thereby in this plane to form a smooth continuation of the jet pipe upstream and downstream of the first porting.

4. An aircraft reaction-propulsion unit or installation as claimed in claim 3, wherein the jet pipe upstream of the first porting is extended axially to close the upstream edge of each valve member when the valve member is in its first position.

5. An aircraft reaction-propulsion unit or installation as claimed in claim 2, wherein each valve member is part-spherical and is pivoted within the part spherical walled chamber to swing about an axis which is a common diameter both of the part-spherical walled chamber and of the valve member.

6. An aircraft reaction-propulsion unit or installation as claimed in claim 5, wherein the jet-pipe comprises cylindrical wall portions upstream and downstream from the part-spherical wall means, and the wall means and each valve member have such diameters that each of the valve members in its first position lies wholly outside an imaginary cylinder which geometrically joins the cylindrical jet-pipe wall portions.

7. An aircraft reaction-propulsion unit or installation as claimed in claim 6, wherein the upstream cylindrical wall portion of the jet-pipe has a cylindrical extension which extends within the wall means and which projects close to but is spaced from the downstream cylindrical wall portion so as thereby to leave a gap through which each valve member travels in moving between its first and second angular positions, and which cylindrical extension has apertures therein to form the first porting which apertures are substantially aligned with the second porting in the wall means.

8. An aircraft reaction-propulsion unit or installation as claimed in claim 7, wherein the cylindrical extension has an outwardly-extending flange projecting therefrom around each aperture towards the second porting, the flange terminating close to the valve member when the latter is in its first angular position.

9. An aircraft reaction-propulsion unit or installation as claimed in claim 6, wherein each valve member has an external part-spherical wall and an internal part-cylindrical wall and wherein the upstream cylindrical portion of the jet-pipe has an extension which extends to close to the upstream edge of each valve member when it is in its first angular position, whereby the extension and the internal wall of the valve member form smooth continuations of the upstream wall portion of the jet pipe.

References Cited in the file of this patent

UNITED STATES PATENTS

| | | |
|---|---|---|
| 1,237,364 | Miller | Aug. 21, 1917 |
| 2,551,372 | Haltenberger | May 1, 1951 |
| 2,657,881 | Douglas | Nov. 3, 1953 |
| 2,680,948 | Greene | June 15, 1954 |
| 2,681,548 | Kappus | June 22, 1954 |

FOREIGN PATENTS

| | | |
|---|---|---|
| 9,435 | Great Britain | May 1, 1908 |